United States Patent [19]

Rydz

[11] Patent Number: 4,642,022
[45] Date of Patent: Feb. 10, 1987

[54] CHAIN TURBINE SYSTEM

[76] Inventor: Leon Rydz, 115 Webster Ave., Yonkers, N.Y. 10701

[21] Appl. No.: 770,139

[22] Filed: Aug. 28, 1985

[51] Int. Cl.$^4$ .............................................. F03B 9/00
[52] U.S. Cl. ........................................... 415/5; 416/7
[58] Field of Search ............................. 60/398; 445/5; 416/7-8

[56] References Cited

U.S. PATENT DOCUMENTS

| | | | |
|---|---|---|---|
| 685,016 | 10/1901 | Towsley | 415/5 |
| 1,237,868 | 8/1912 | Clarkson | 415/5 |
| 1,481,397 | 1/1924 | Tetetleni | 415/5 X |
| 1,749,506 | 3/1930 | Randmetz | 416/7 |
| 1,847,855 | 3/1932 | Young | 415/5 |
| 3,542,485 | 11/1970 | Romero | 416/7 |
| 3,882,320 | 5/1975 | Schmeller | 290/43 |
| 4,049,300 | 9/1977 | Schneider | 415/5 X |
| 4,134,469 | 1/1979 | Davis | 415/5 X |
| 4,303,834 | 12/1981 | Li | 415/5 X |
| 4,494,008 | 1/1985 | Patton | 415/5 X |

FOREIGN PATENT DOCUMENTS

| | | | |
|---|---|---|---|
| 370067 | 2/1923 | Fed. Rep. of Germany | 415/5 |
| 3303547 | 8/1984 | Fed. Rep. of Germany | 416/7 |
| 413493 | 8/1910 | France | 416/8 |
| 2311941 | 12/1976 | France | 60/398 |
| 2534636 | 4/1984 | France | 416/8 |
| 101241 | 9/1923 | Switzerland | 415/5 |

Primary Examiner—Everette A. Powell, Jr.
Attorney, Agent, or Firm—David H. Semmes; Warren E. Olsen

[57] ABSTRACT

A chain turbine system of the type including pairs of chains supporting a plurality of pivoted deflection buckets. The pairs of chains are suspended across a moving stream, so that a lower portion of the chains and the deflection buckets travel through the stream at right angles to the current and an upper or returning portion of the chains and deflection buckets is out of contact with the stream. Modifications of the invention include affixing one or more guide wheels to the discharge ends of the deflection buckets such that the guide wheels engage a stabilizing track, while traversing the stream bed as the lower driving portion of the chain, and on the return upper portion of the chains the guide wheels engage a stabilizing cable or rod. Also, when the stream current is scant, the system may be built with a pressure or accumulation tank across the stream so that the flowing stream may be accumulated, then discharged downwardly through discharge ducts to the deflection buckets.

5 Claims, 11 Drawing Figures

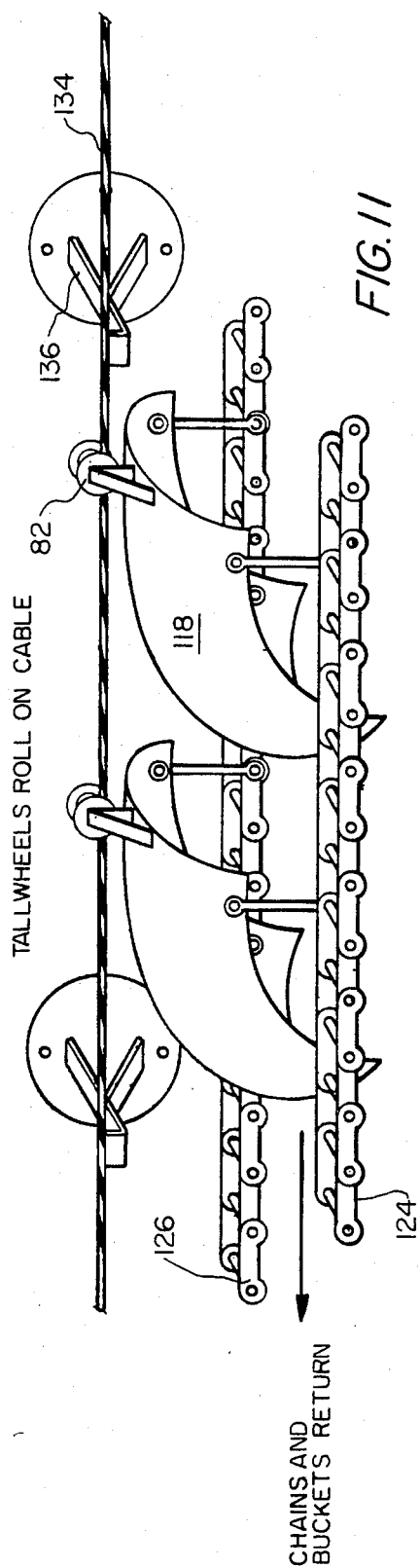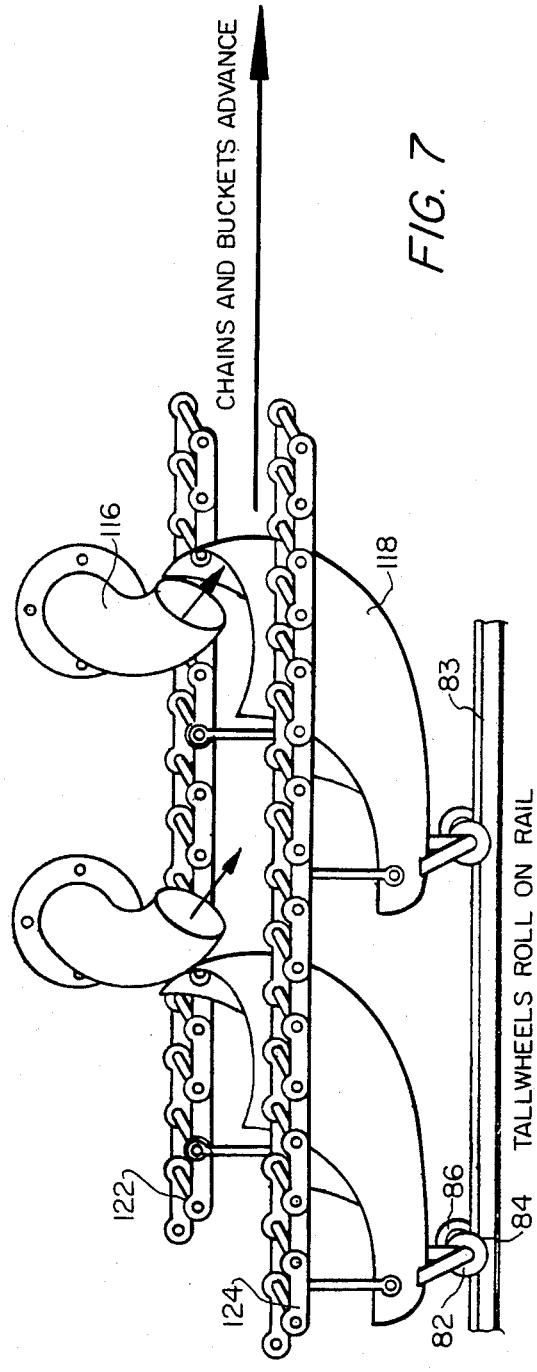

CHAIN TURBINE SYSTEM

BACKGROUND OF THE INVENTION

1. Field of the Invention

Chain turbines are designed to develop power from the falling and running water of rivers. Such chain turbines rotatably positioned within a river are capable of efficiently converting running water or vertical waterfalls into rotational energy.

The chain turbine principle is similar to that of reaction-type turbines, except that the deflection buckets are not placed upon a runner encircling a shaft, rather, the deflection buckets are attached to two closed loop chains which extend across the water source. Thus, the work exerted by the river is developed simultaneously at all deflection buckets in the river as opposed to the use of standpipe jet acting upon a few buckets supported upon a runner in conventional turbines.

2. The Prior Art

Earlier patents such as RANDMETZ U.S. Pat. No. 1,749,506, ROMERO U.S. Pat. No. 3,542,485 and SCHMELLER U.S. Pat. No. 3,882,320 have utilized the principle of elongated water wheels. A series of paddles or vanes is attached to two endless chains which follow the direction of the current. The surface less than each paddle faces the stream current at an angle of 90 degrees. The moving current pushes against the surface of each paddle and urges the paddle to move with the current.

Elongated water wheels are inefficient. Since the vanes are supported one behind the other upon the chains, only the first vane directly faces the current and receives the full thrust of the current. The second vane, which is in the wake of the first vane receives less thrust, the third vane still less, and so on.

It is submitted that DAVIS U.S. Pat. No. 4,134,469 would be relatively inefficient due to the drag created by the action of the wind on the returning buckets PATTON U.S. Pat. No. 4,494,008 addresses the problem of drag by separating his chains which are angled, such that each side moves in a separate trough, thus, the wind strikes one side of the vane only and does not interfere with the side of the returning vanes. However, it is submitted that the wind would strike only a portion of the vanes penetrating very little, or not at all, because the bottom of the trough will interfere with its passage. The result is that the wind will act upon only the top of the vanes rather than on the entire surface of the vanes.

LI U.S. Pat. No. 4,303,834, uses airfoils, attached to two cables suspended transversely as a windmill to produce power. The airfoils are mechanically adjusted as they rotate. LI's device is an elongated propeller-type windmill.

The conventional chain turbine exhibits an efficiency of approximately 60%. However, this efficiency can be enhanced by increasing the velocity of the water as a result, for example, of narrowing a river, or by utilizing a greater number of buckets, so as to increase the total surface area of the paddles

SUMMARY OF THE INVENTION

The present invention provides means to convert the kinetic energy of stream or waterfall into rotational energy. The chain turbine includes two endless chains, supported in parallel to each other, each chain rotating about two or more sprockets, located at either side of the moving water, such that the lower portions of the chains are located just below and parallel to the surface of the moving water stream. A series of buckets are attached pivotally to each chain and a tail wheel may be provided for engaging a rail and thereby stabilizing each bucket as it traverses the moving stream.

The configuration of the chain turbine may be modified to accommodate the following factors:
1. The velocity of the current;
2. The volume of water in motion;
3. The head or mass of the waterfall or stream.

Four embodiments of applicant's chain turbine are illustrated herein.

BRIEF DESCRIPTION OF THE DRAWINGS

FIG. 7 is a fragmentary perspective, showing single tail wheel assemblies for the deflection buckets and curvate discharge ducts leading from a pressure tank.

FIG. 11 is a fragmentary perspective of a cable or rod support for the single tail wheels of those deflection buckets illustrated in FIG. 7.

Referring to FIGS. 1 and 2, this waterfall embodiment is designed to take advantage of high current velocity and high water volume.

Figure 1:
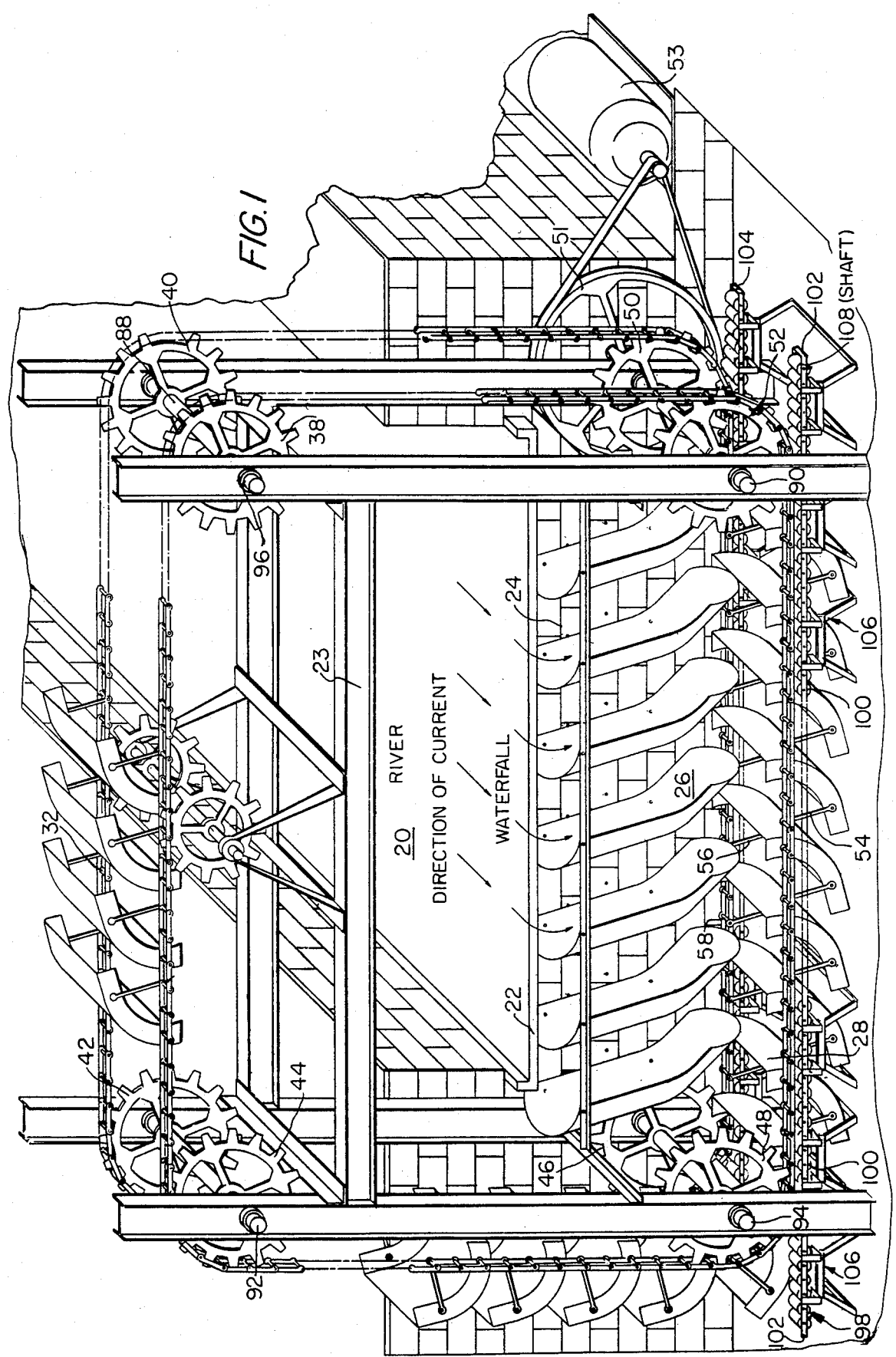
FIG. 1 is a perspective view of a chain turbine configured for low to medium head and a high velocity, large volume overflow.

River bed 20 and ledge 22 are enhanced such that turbulence is minimized. Ledge 22 extends beyond containment structure 24, such that the guide vanes 26 are partially shielded by the ledge 22 and the water is spilled directly into the guide vanes 26. The entire guide vane and chain assembly may be mounted in a channel iron truss 23.

Guide vanes 26 are semi-cylindrical in cross-section so as to create minimal turbulence while the water is being redirected, thus maintaining higher water velocities. The lower portions of guide vanes 26 direct the water onto deflection buckets 28. The water flow or current is as near to parallel to the direction of travel of deflection buckets 28 as is practically possible, thereby maximizing the transfer of energy from the water to the chain turbine.

Figure 2:
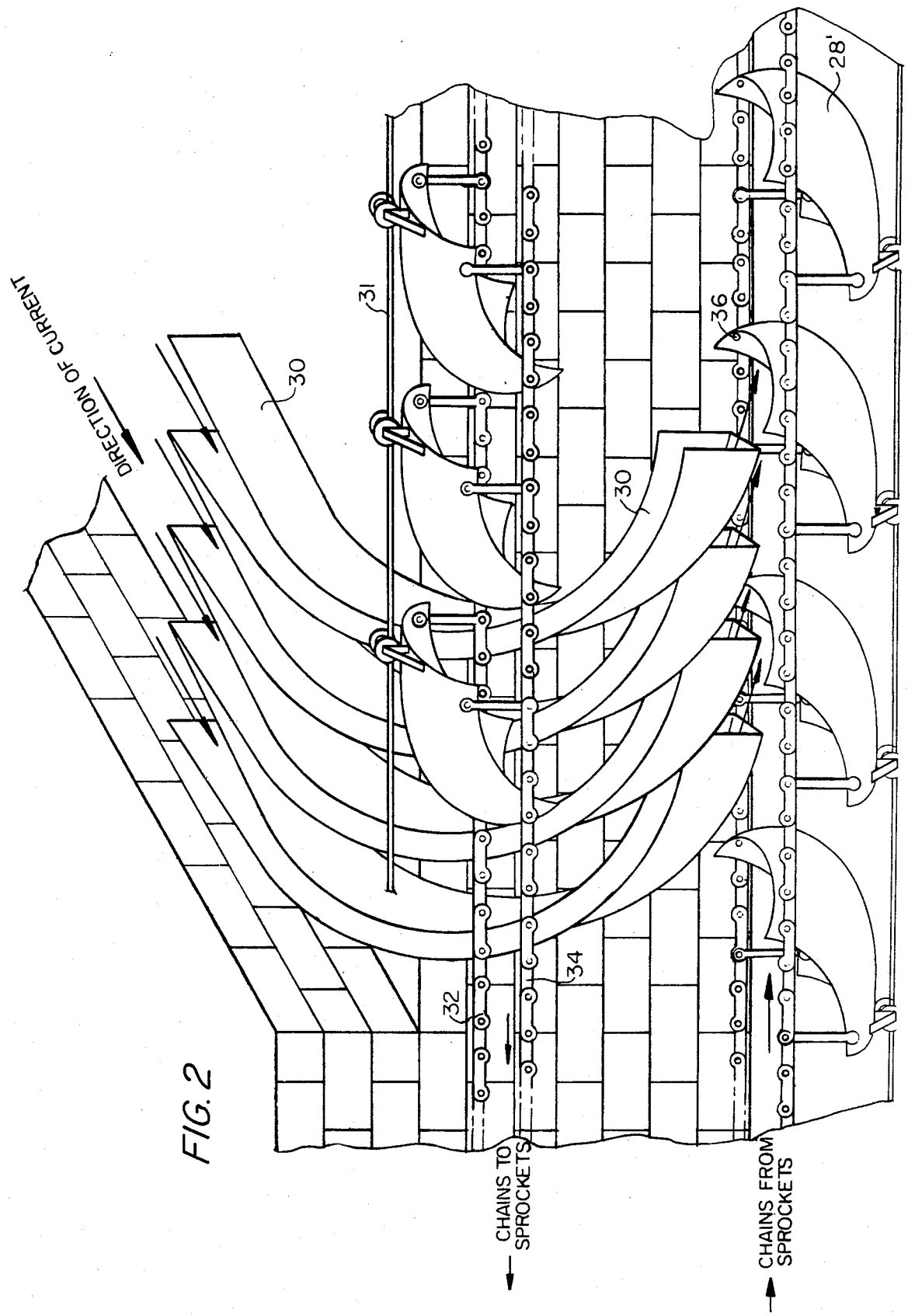
FIG. 2 is a perspective view of proposed guide troughs for a low to medium head chain turbine.
Figure 3:
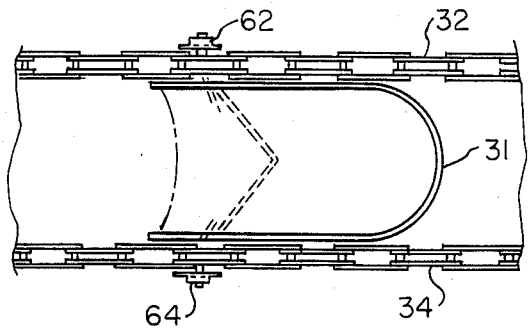
FIG. 3 is a plan view of the chain turbine deflection bucket.
Figure 4:
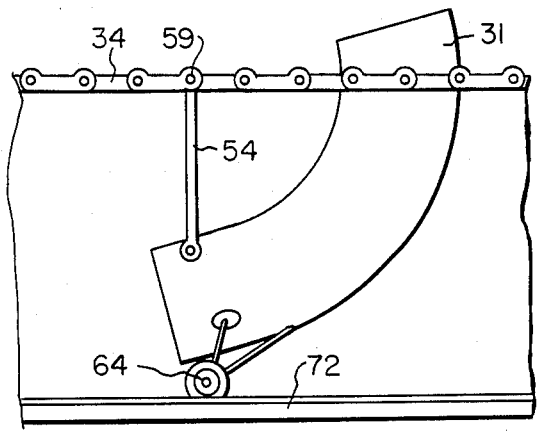
FIG. 4 is a side elevation of the deflection bucket.

A modified arrangement is illustrated in FIG. 2 wherein curvate guide troughs 30 channel the water, while still traveling over the stone bed and smoothly change the direction of flow, as the water is directed onto deflection buckets 28'. Guide troughs 30 are positioned so as to direct the flow of water along a path that is as near to parallel to the direction of travel of the deflection buckets 28' as possible. Guide troughs 30 may also be hydrodynamically shaped, so as to minimize turbulence.

Deflection buckets 28' serve to transfer the kinetic energy from the flowing stream to the chains 32, 34 upon which deflection bucket is attached. Deflection buckets 28' are specially shaped in order to maximize the transfer of kinetic energy, as illustrated in FIG. 2. Additional drive is received from the shape of deflection buckets 28' due to the jet effect of the water stream, as it is directed off and behind deflection bucket 28' and in a direction generally opposite to the movement of deflection buckets 28'.

As shown in FIGS. 1 and 2, deflection buckets 28 and 28' are mounted between parallel chains 32 and 34 by means of extended chain link pins 36, such that the individual deflection buckets 28, 28' are free to pivot as the chains travel around the support cogs 38–52. Suspension struts 54 and 56 are fixed to the lower edges of each deflection bucket and attached to the chain by extended chain link pins 58, so as to suspend the buckets without impeding the flexibility of chains 32, 34. Deflection buckets 28, 28' are preferably spaced at regular intervals parallel to chains to aid in smooth and uniform rotation of the chains.

Figure 5:
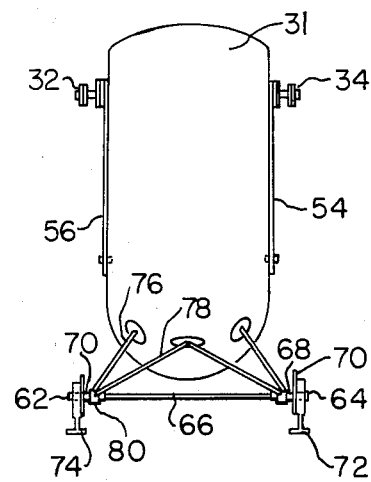
FIG. 5 is an end elevation of a deflection bucket having two tail wheels.

A single tail wheel 60, such as illustrated in FIG. 2 may be fitted to each deflection bucket to provide additional support. In the modification shown in FIG. 5, two tail wheels or rollers 62, 64 may be employed. A primary advantage of the two roller system is that additional lateral support is provided. Rollers 62, 64 are mounted upon a common shaft 66. The ends of shaft 66 are supported in bushings 68 and 70, arranged to minimize friction with the shaft. Rollers 62, 64 are flanged as at 70 on the inner edge, such that when the rollers are on the tracks 72, 74, lateral forces will not derail the rollers. Suitable struts 76, 78, may be interposed between the lower part of deflection bucket 31 and support roller 80, so as to rigidize the tail wheel assembly with respect to the pivoting deflection bucket.

The single roller system illustrated in FIG. 7 utilizes one track 83 and one roller 82 with flanges 84, 86 on either side of the roller.

As illustrated in FIG. 1, chains 32, 34 are supported by sprockets 38–52, concentrically mounted upon shafts 88, 90, 92, 94, which include suitable bearings 96. Manifestly, two or more pairs of sprockets may be used to support the chains depending on the exact configuration of the chain turbine.

It is recognized that large lengths of chain will tend to sag and flex, possibly causing damage due partly to the combined weight of the chain and attached buckets and due, also, to the force of the water, as it strikes the deflection buckets. Therefore, chain supports as illustrated in the lower portion of FIG. 1 may be used to support chains 32, 34.

The chain support assembly 98 extends under both chains 32, 34 such that the chain is in contact with rollers 100. Roller frames 102, 104 are attached to support brackets 106. Rollers 100 are mounted within roller frames 102, 104 on transverse shafts 108 with suitable bearings, such that friction between rollers 100 and the individual shafts is minimized.

Figure 6:
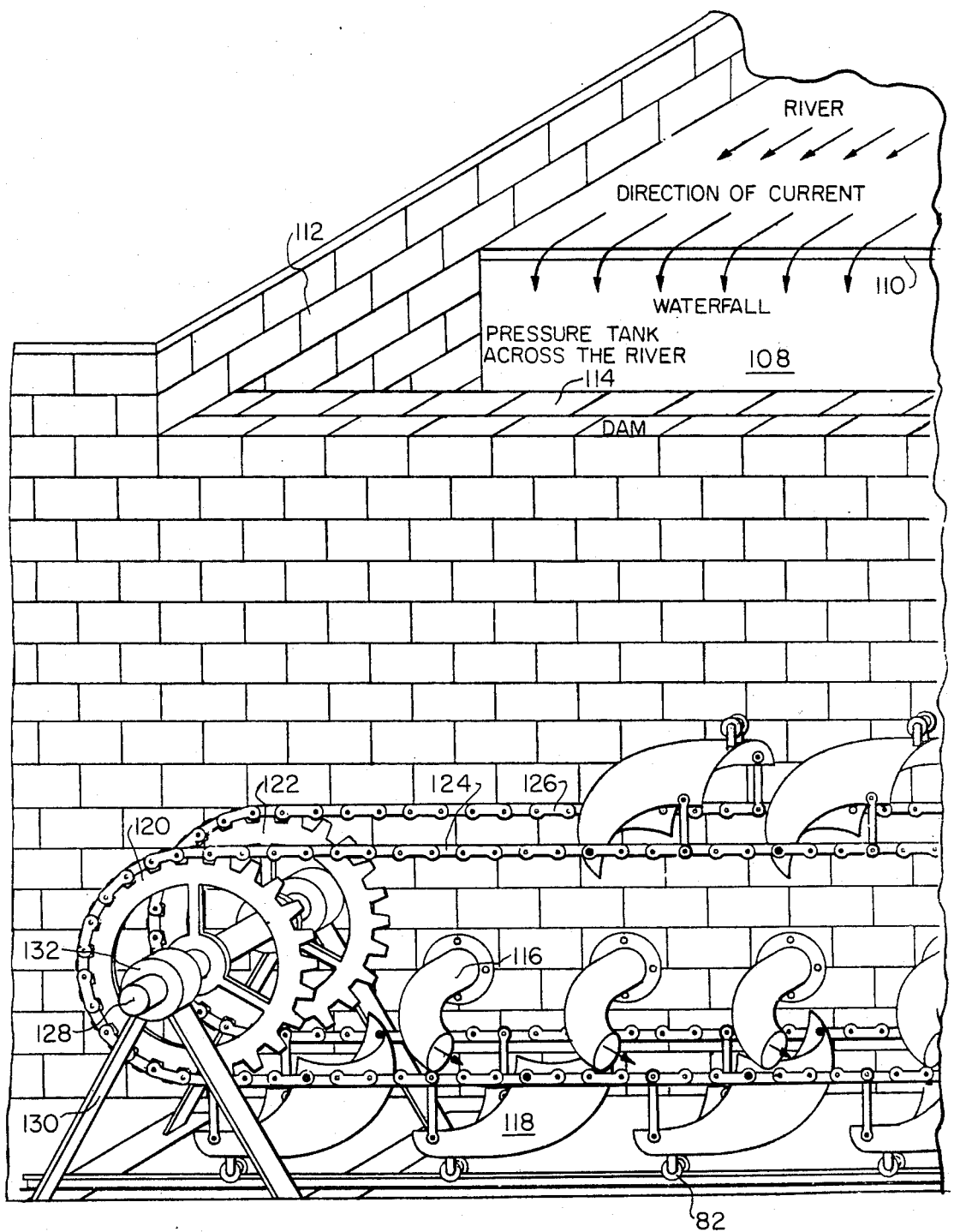
FIG. 6 is a fragmentary perspective view of a chain turbine configured for medium head and medium flow velocity, in a medium or large volume current.

In FIGS. 6 and 7, there is illustrated a modified turbine system which includes a pressure or build-up tank suited for water sources that have a medium head and small or large volume of water. This system is particularly advantageous when the volume and velocity of water is small, since a high degree of rotational energy may be produced.

A pressure tank 108 is defined between water fall 110, side walls 112 and front wall or dam 114. Pressure tank 108 extends across the river and the front wall or dam 114 may be constructed, so as to create a head higher than that of the actual waterfall 110. Whenever pressure tank 108 becomes sufficiently full, the water is discharged selectively through discharge ducts 116 which are angled to supply water to deflection buckets 118 having single roller 82. The turbine system illustrated in FIGS. 6 and 7 utilizes sprockets 120, 122 per chain 124, 126. Sprockets 120, 122 are mounted upon a shaft 128 supported by frame 130 and bushing 132. A novel use of the single tail wheel system is illustrated in FIG. 11. If the moving channel of water is wide, thereby requiring a long chain, tail wheel or roller 82 can serve as a chain support while engaging support cable 134 to prevent sagging. A similar support cable is illustrated in FIG. 2.

In this mode, as illustrated in FIG. 11, support brackets 136 are spaced along the front wall 114 to which they are attached, in sufficient number to suppport chains 124, 126 and buckets 118 via a rod or cable 134 engaged by the individual tail wheels 82. Tail wheel 82 engages the rod or cable 134, as bucket 118 departs the top of the upper right sprocket (not illustrated) and is disengaged as the bucket starts to descend below left sprocket 120. Sequentially, tail wheel 82 travels along track 83, as described above, adding support and stability to deflection buckets 118 while they are being driven.

The operation of the chain turbine is directly dependent upon the volume of water flowing into pressure tank 108. When the water level in pressure tank 108 reaches a certain level, a valve or valves open allowing water to flow out of the tank through discharge ducts 116. Pressure tank 108 is not discharged until a predetermined volume of water has accumulated within the tank. The duty cycle of the system will be dependent upon the time required to fill pressure tank 108.

Figure 9:
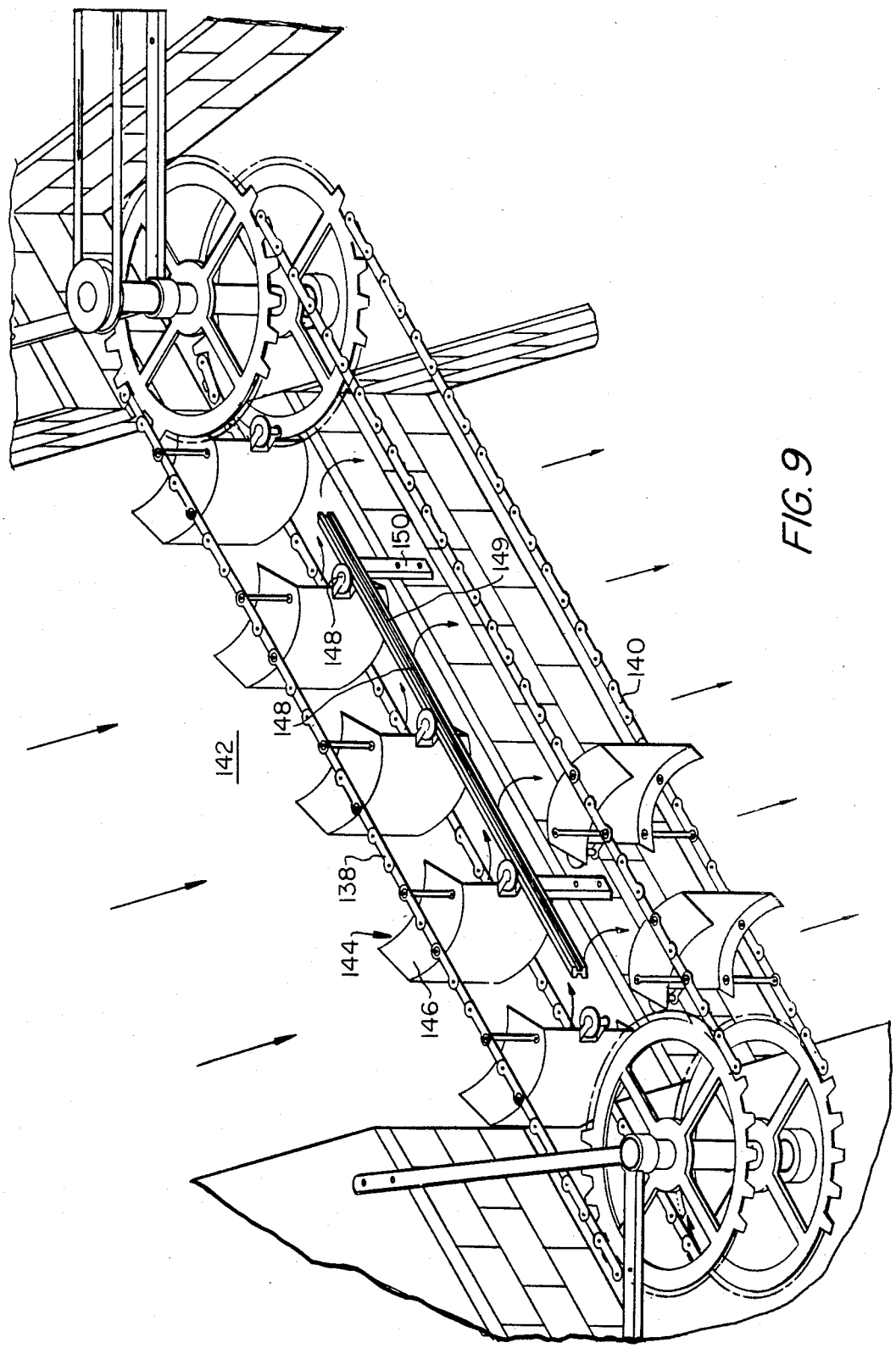
FIG. 9 is a perspective view of modified chain turbine for a waterfall.

The chain turbine illustrated in FIG. 9 is especially suited for use in small rivers having a small waterfall. The up-stream sides of chain 138, 140 are positioned to extend over a small waterfall 142, so that the water strikes buckets 144 and then escapes below without striking the returning bucket. Each bucket 144 is equipped with a flanged tail wheel 148 to aid in keeping the bucket from sinking. Tail wheel 148 engages track 149 which is held in place by brackets 150, while buckets 144 engage waterfall 142.

A plate 146 is mounted on top of each bucket 144 to provide hydrodynamic lift, as an aid to tail wheel 148 in supporting the bucket. Alternately, plate 146 may be replaced with a pulley system as illustrated in FIG. 11. The returning buckets 144 may be supported, also, by pulley and cable system, as illustrated in FIG. 11.

Figure 8:
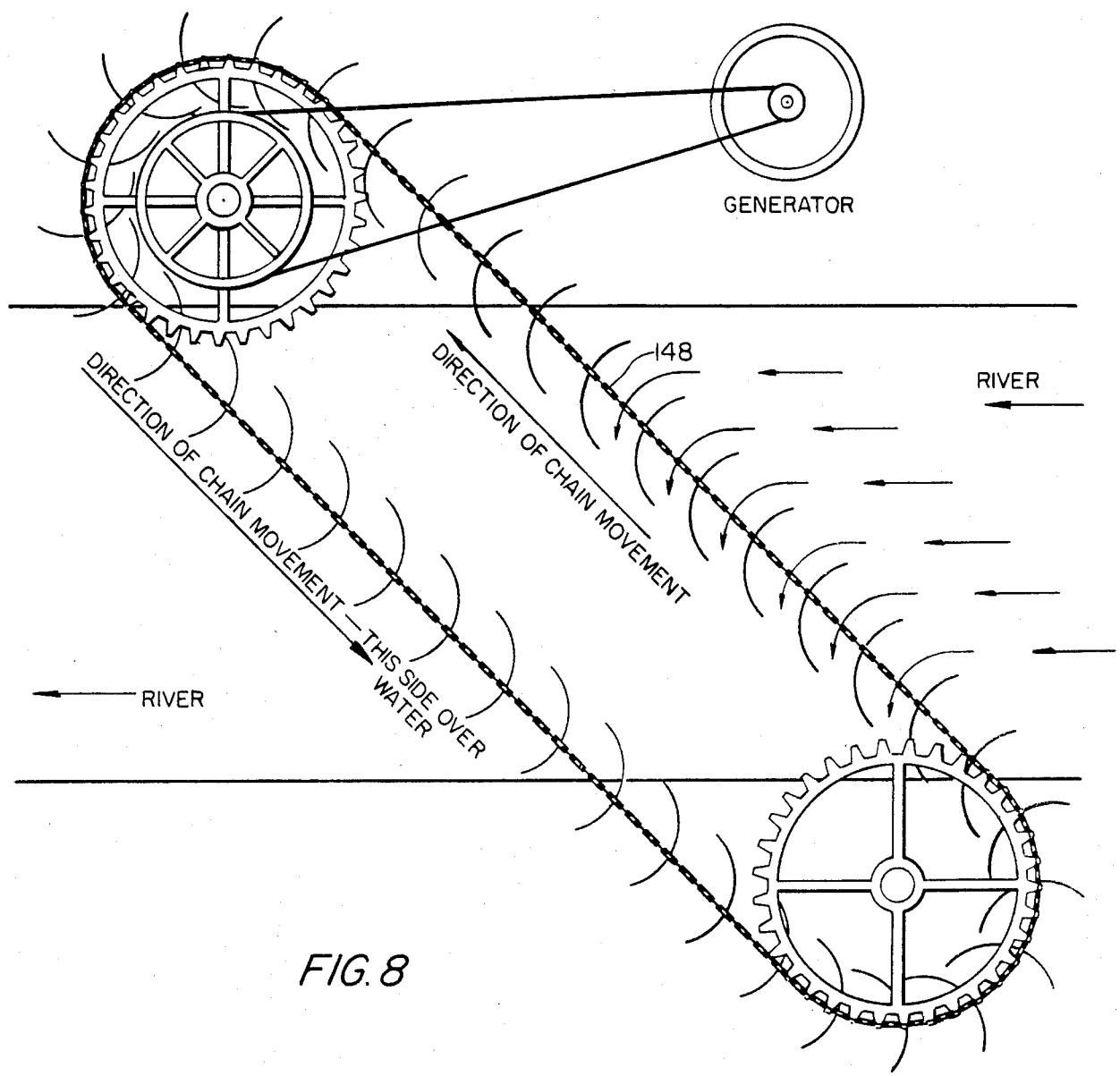
FIG. 8 is a schematic illustration of a chain turbine configured for a very low head and high volume in a high velocity current flow.
Figure 10:
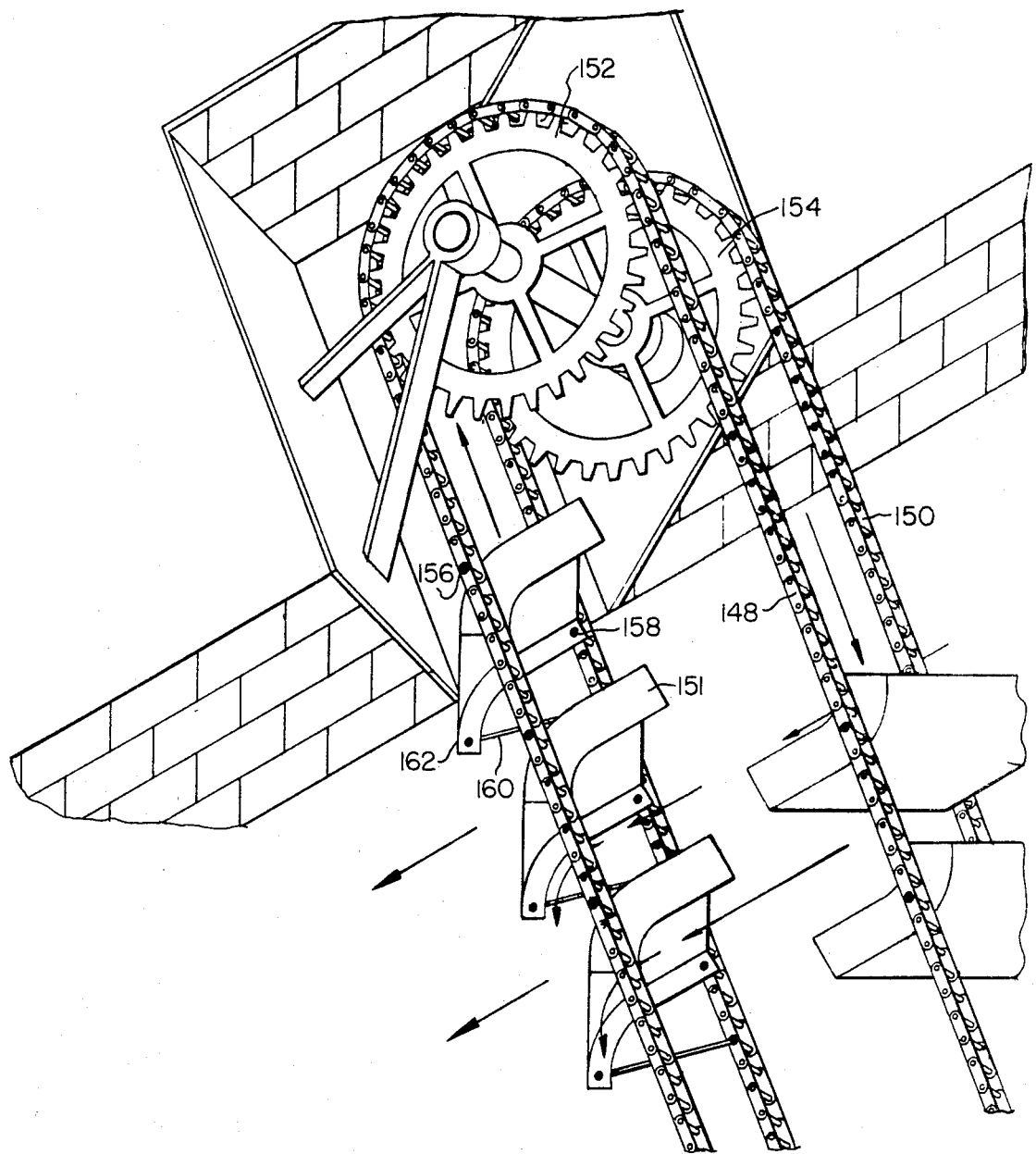
FIG. 10 is a fragmentary schematic illustration of slant installation chain turbine configured as in FIG. 8 for low head, large volume, high velocity current flow.

Another embodiment of the present invention is best suited for a water source without a waterfall. Referring to FIGS. 8 and 10, a chain turbine is mounted across the water source at an angle such that one side of chains 148, 150 is immersed while the other side is suspended above the water. In FIG. 8 there is schematically illustrated a single chain 148 configuration and in FIG. 10 there is illustrated the dual chain 148, 150 configuration. In the FIG. 10 configuration, tail wheels and a support pulley system may be used to aid in supporting deflection buckets 151, as detailed in FIG. 11.

Deflection buckets 151 are shaped to be perpendicular to the surface of the water and parallel to the current, thereby maximizing the driving power of the turbine. Sprockets 152, 154 are mounted at an angle to the water so as to support the current engaging buckets 151 perpendicularly to the surface of the water. Buckets 151 are pivoted to chains 148, 150 by pivot pins 156, 158 and a pivoting strut 160 may counterconnect the curvate lip 162 of the bucket with chain 150.

As will be apparent, applicant's chain turbine includes the following advantages:

1. A large volume of water may be used to produce high power, as opposed to conventional turbine systems where high speed of water is required to produce high power.

2. A great number of buckets may be suspended upon chains stretching across a river, as opposed to conventional turbine systems wherein only a few small buckets can be supported upon an axle.

I claim:

1. A chain turbine system of the type supported across a waterfall comprising:
   A. a first frame mounted at one side of the waterfall and supporting a first shaft aligned with the waterfall, said first shaft supporting a chain sprocket at either end;
   B. a second frame mounted at the other side of said waterfall and supporting a second shaft, said second shaft supporting a chain sprocket at either end;
   C. a pair of chains rotatably suspended in parallel and across said waterfall, each said chain engaging a pair of parallel chain sprockets, such that a driving portion of the chain travels through the waterfall, as a return portion of the chain is suspended apart from the waterfall;
   D. a plurality of paddle-like deflection buckets pivoted at each side to each of said chains, each bucket further including a pair of pivoting struts interconnecting a free end side of the bucket with said chains;
   E. individual roller wheels mounted at the free end of each bucket, so as to extend downwardly of the free end of the bucket during the driving portion and to extend above the bucket during the return portion;
   F. a transverse track extending across the waterfall bed adjacent the driving portion of said chains, so as to be engaged by said roller wheels, and
   G. a chain support assembly extending across said waterfall and beneath each said chain during the driving portion and further including:
      i. a roller frame supported upon brackets and positioned beneath each said chain;
      ii. a plurality of rollers mounted upon shafts extending through said roller frame and axially aligned with the waterfall, such that said roller engage each said chain during the lower driving portion.

2. A chain turbine system of the type supported across a waterfall as in claim 1, wherein said shafts are supported horizontally, so that a lower driving portion of said chains travel through said waterfall and the return portion of said chains travels above the waterfall.

3. A chain turnbine system of the type supported across a moving stream as in claim 1, said roller wheels having an inner flange engagable with said transverse track.

4. A chain turbine system of the type supported across a moving stream as in claim 1, further including an accumulation tank constructed in the river bed and having a plurality of valved discharge ducts leading downwardly to said deflection buckets within said driving portion.

5. A chain turbine system of the type supported across a moving stream as in claim 1, wherein said shafts are supported vertically and pairs of chains are suspended so that a driving portion of the chains and attached deflection buckets intersects the fall, while a returning portion of the chains and deflection buckets is suspended beyond and clear of the fall.

* * * * *